United States Patent [19]

Tarleton

[11] Patent Number: 4,975,911
[45] Date of Patent: Dec. 4, 1990

[54] INTERFACE CIRCUIT FOR DATA TRANSMISSION BETWEEN A MICROPROCESSOR SYSTEM AND A TIME-DIVISION-MULTIPLEXED SYSTEM

[75] Inventor: George K. Tarleton, Phoenix, Ariz.

[73] Assignee: AG Communication Systems Corporation, Phoenix, Ariz.

[21] Appl. No.: 369,888

[22] Filed: Jun. 22, 1989

[51] Int. Cl.$^5$ ............................................... H04J 3/06
[52] U.S. Cl. ................................................. 370/100.1
[58] Field of Search .................. 370/55, 61, 68.1, 103, 370/100.1, 108, 110.1; 328/63, 72

[56] References Cited
U.S. PATENT DOCUMENTS
4,717,914  1/1988  Scott ..................................... 370/55

4,797,574  1/1989  Okubo et al. ......................... 328/63

Primary Examiner—Douglas W. Olms
Assistant Examiner—Melvin Marcelo
Attorney, Agent, or Firm—Anthony J. Baca

[57] ABSTRACT

The circuit of the present invention provides a signal which allows data to be transferred between a first synchronous system to a second synchronous system. Where the first system is a Time-Division-Multiplexing (TDM) system and the second system is a Microprocessor system. The transfer is allowed after three or four memory cycles of the Microprocessor system after receiving the end of time slot signal. This invention requires that the Microprocessor system access the Time-Division-Multiplexed system as an Input/Output (I/O) device.

23 Claims, 2 Drawing Sheets

INTERFACE CIRCUIT FOR DATA TRANSMISSION BETWEEN A MICROPROCESSOR SYSTEM AND A TIME-DIVISION-MULTIPLEXED SYSTEM

FIELD OF THE INVENTION

The present invention relates in general to digital logic circuits, and more particularly to a circuit that allows a first synchronous system to interface to a second synchronous system.

BACKGROUND OF THE INVENTION

Synchronous systems require that data be stable at specific, predefined time periods. Should the data change during these time periods, it may be improperly interpreted. More specifically, when a microprocessor accesses data, the data must not change during critical portions of the access cycle.

Modern digital Telecommunication systems use multiple microprocessors to execute the complex software which controls the Telecommunication systems. These microprocessors are considered synchronous systems, but quit often are not synchronized to each other. In addition, the microprocessors are not synchronized to the Time-Division-Multiplexed (TDM) data.

TDM data is a synchronous serial data stream divided into several time slots. Where each time slot carries Pulse Coded modulation (PCM) voice samples. Should the microprocessor need to access the TDM data, some form of translation between the microprocessor synchronous system and the TDM synchronous system must be performed.

Microprocessors generally access data in a parallel format while, TDM data is generally in a serial format. Therefore, a serial-to-parallel converter is used to transfer the data from the TDM data stream to the microprocessor, and a parallel-to-serial converter is used to transfer the data from the microprocessor to the TDM data stream.

In prior art implementations, the microprocessor accesses the converters directly. Should the microprocessor try to access a converter while the data is being serially shifted, the microprocessor is placed in a HOLD condition. Once the data is shifted in, the microprocessor is released from the HOLD condition and normal processing can resume.

The present invention precludes placing the microprocessor in a HOLD condition and therefore consumes less processing time. The present invention adds a latch between the microprocessor and the serial-to-parallel converter. But, the data must still be transferred between the latches and the converters at an appropriate time. The present invention determines when this transfer is to occur.

Accordingly, it is the objective of the present invention to provide a synchronous interface circuit which allows a synchronous microprocessor to access a synchronous Time-Division-Multiplexed (TDM) data stream.

SUMMARY OF THE INVENTION

In accomplishing the objective of the present invention there is provided a synchronizing circuit for generating a transfer signal that indicates when data is to be transferred through an interface circuit. The interface circuit is connected between a microprocessor system and a time-division-multiplexed system.

The synchronizing circuit includes a clock generator that generates a clock signal only when the microprocessor system is accessing memory. An end detector detects when the time-division multiplexed system has finished accessing the interface circuit. Next, a glitch filter is connected to the end detector for stabilizing the signal from the end detector.

The synchronizing circuit further includes an enable circuit connected to the clock generator and the glitch filter, the enable circuit generates the transfer signal when both a clock signal and an end detected signal are present. To insure that only one transfer signal is generated per frame, a clear circuit receives the transfer signal, and responsive to receiving the transfer signal the clear circuit blocks further generation of the transfer signal until the time-division multiplexed system accesses the interface circuit.

DESCRIPTION OF THE DRAWINGS

A better understanding of the invention may be had from the consideration of the following detailed description taken in conjunction with the accompanying drawings in which.

DESCRIPTION OF THE PREFERRED EMBODIMENT

Figure 1:
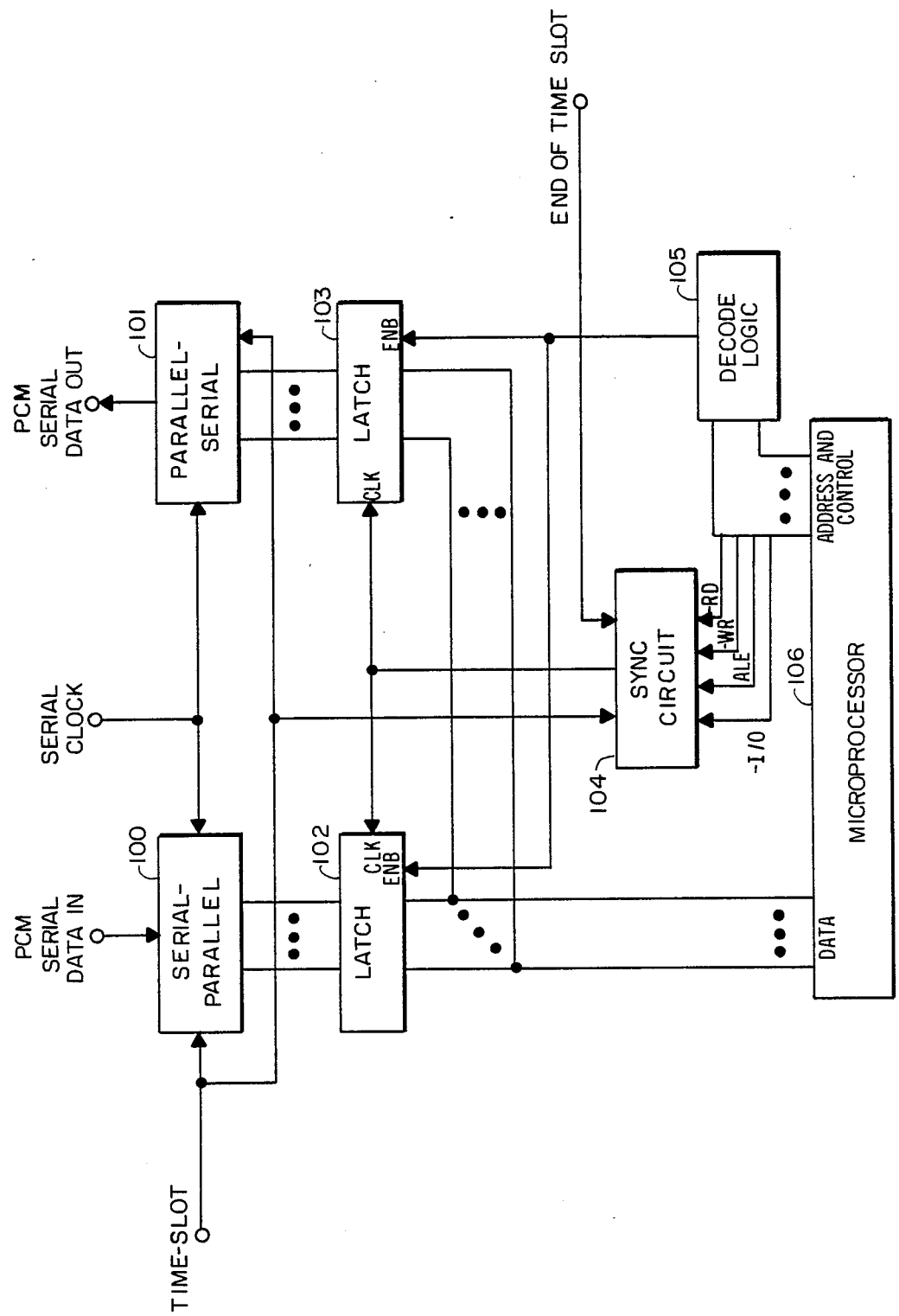
FIG. 1 is a block diagram of the interface circuit.
Figure 2:
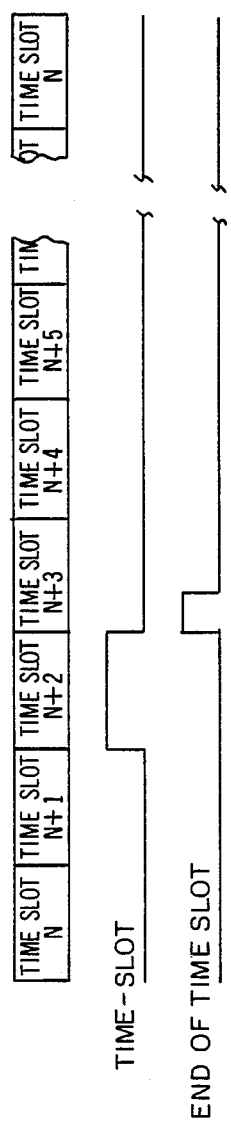
FIG. 2 is a timing diagram for the block diagram of FIG. 1, showing the structure of the serial data stream and selected signals.

Turning to FIGS. 1 and 2, a general description of the present invention will be given.

FIG. 2 shows the structure of a TDM data link. The TDM data link is divided into N time slots, where each time slot carries PCM voice data. A SERIAL CLOCK signal is used to define the individual bits within each time slot. And a TIME-SLOT signal defines a given time slot of the serial data.

Before the data can be accessed by microprocessor 106, a translation must be performed. Because both the TDM and the microprocessor are synchronous systems, yet asynchronous to each other, the data must be converted from one system time period to the other.

For TDM data to be read by microprocessor 106, it must first be converted from serial to parallel by serial-to-parallel converter 100. Latch 102, at the appropriate time latches the data from serial-to-parallel converter 100. The latched data can then be read by microprocessor 106.

For microprocessor 106 to write data to the TDM data stream, it writes the data to latch 103. The data is then transferred, at the appropriate time, from latch 103 to parallel-to-serial converter 101. During the assigned time slot, the data is shifted out of parallel-to-serial converter 101 onto the TDM serial data stream.

A problem exists as to when to transfer the data between the latches and the converters. Latch 102 cannot be updated while the data is being shifted into serial-to-parallel converter 100 or while microprocessor 106 is reading from latch 102. Parallel-to-serial converter 101 cannot be updated while the data is being shifted out of parallel-to-serial converter 101 or while microprocessor 106 is writing to latch 103.

The present invention provides a SYNC CIRCUIT 104 that arbitrates and determines when to update latch 102 and parallel-to-serial converter 101. SYNC CIRCUIT 104 generates the transfer signal three or four memory cycles of microprocessor 106 after receiving the end of time slot signal. This requires that microprocessor 106 access latch 102 and 103 as Input/Output (I/0) devices.

Figure 3:
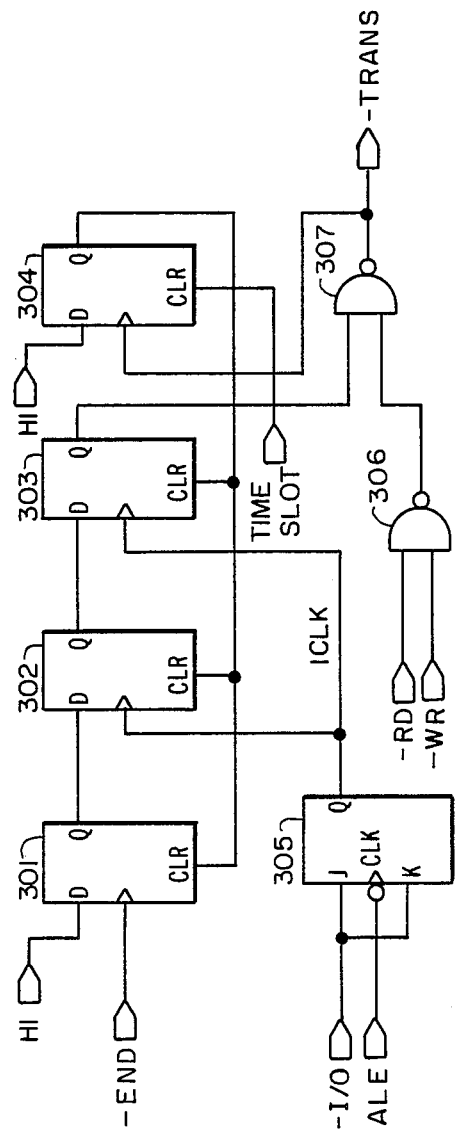
FIG. 3 a schematic diagram of the synchronizer circuit, in accordance with the present invention.

Referring to FIG. 3, a detailed description of the operation of the circuit of the present invention will be given.

The synchronous interface circuit of the present invention accepts various inputs signals and generates a single output signal (—TRANS) which initiates the transfer processes. Input signals include; TIME SLOT which indicates that the assigned time slot is active, —END which indicates the end of the assigned time slot, —I/0 which indicates that microprocessor 106 is accessing I/0, ALE the Address Latch from microprocessor 106, —WR the Write enable from microprocessor 106, and —RD the Read enable from microprocessor 106. HI is a logic high signal.

Signal —I/0 is a logic high when microprocessor 106 accesses memory. This logic high along with the falling edge of ALE causes the output of clock generator 305 (ICLK) to toggle. But, when microprocessor 106 accesses I/0, signal —I/0 is a logic low, and the falling edge of ALE will not cause the output of clock generator 305 to toggle. In this way the synchronous interface circuit will not generate the —TRANS signal while microprocessor 106 is accessing I/0. Therefore, if latches 102 and 103 are accessed as I/0, the —TRANS signal will not be generated while microprocessor 106 is accessing the interface circuit.

The rising edge of —END clocks a logic high into detector 301. The logic high from 301 is clocked into glitch filter 302 by the next rising edge of ICLK. Because the setup and hold times of glitch filter 302 may be violated, transfer latch 303 forms a double buffer whereby the output of glitch filter 302 is stable before it is latched into transfer enable latch 303 by the next rising edge of ICLK.

The logic high from 302 is latched into transfer enable latch 303 only when microprocessor 106 is preparing to perform a memory access cycle. As microprocessor 106 performs the memory access cycle, either the —RD or —WR signal will change to a logic low, forcing —TRANS to a logic low. The logic low on —TRANS indicates that the TDM system has finished accessing the interface circuit and microprocessor 106 is not accessing the interface circuit and the data can be transferred between the latches and the converters.

When microprocessor 106 has finished the memory access cycle, —RD or —WR returns to a logic high, forcing —TRANS to 30 a logic high. The rising edge of —TRANS clocks a logic high into clear D-FF 304. The output of clear D-FF 304 forces 301, 302, and 303 to output logic low which blocks —TRANS from being generated again.

During the next assigned time slot, TIME SLOT clears clear D-FF 304, removing the clear signal on 301, 302, and 303 and readies the circuit for the next frame. This insures that —TRANS is generated only once per TDM frame.

From the above discussion it is apparent to those skilled in the art that, depending on the state of ICLK at the time of reception of —END, —TRANS is generated during either the third or forth memory cycle after the end of the time slot. It should be noted that if the —I/0 signal is inverted, then —TRANS would be generated during the third or fourth I/0 cycle after the reception of —END.

In summary, the circuit of the present invention provides a signal (—TRANS) which allows data to be transferred from serial-to-parallel converter 100 to latch 102 and from latch 103 to parallel-to-serial converter 101. The transfer is allowed after three or four memory cycles of microprocessor 106 after receiving the end of time slot signal. This requires that microprocessor 106 access latch 102 and 103 as an I/0 device.

Although the preferred embodiment of the invention has been illustrated, and that form described, it will be readily apparent to those skilled in the art that various modifications may be made therein without departing from the spirit of the invention or from the scope of the appended claims.

What is claimed is:

1. A synchronizing circuit for generating a transfer signal arranged to indicate when data is to be transferred through an interface circuit, said interface circuit connected between a microprocessor system and a time-division-multiplexed system, said microprocessor system includes a memory, said synchronizing circuit comprising:
   clock generator means for generating a clock signal only when said microprocessor system is accessing said memory;
   end detector means arranged to detect when said time-division multiplexed system has finished accessing said interface circuit, and;
   enable means connected to said clock generator means and said end detector means, said enable means generating said transfer signal.

2. A synchronizing circuit as claimed in 1, wherein said clock generator means including a first input arranged to receive a first memory signal from said microprocessor system signifying that said microprocessor system is preparing to access said memory, and said clock generator means further including a second input arranged to receive a validation signal from said microprocessor system, wherein said validation signal defines when said first memory signal is valid.

3. A synchronizing circuit as claimed in 1, wherein said end detector means including an input arranged to receive an end signal from said time-division multiplexed system, said end detector means generating an end detected signal.

4. A synchronizing circuit as claimed in 3, further comprising:
   glitch filter means connected between said end detector means and said enable means, said glitch filter means arranged to stabilize said end detected signal.

5. A synchronizing circuit as claimed in 4, wherein said glitch filter including a first input arranged to receive said end detected signal and a second input arranged to receive said clock signal, said glitch filter means further including an output, said glitch filter means arranged to generate a stabilized end detected signal from said output.

6. A synchronizing circuit as claimed in 5, wherein said enable means including a first input arranged to receive said stabilized end detected signal, a second input arranged to receive a second memory signal from said microprocessor system signifying that said microprocessor system is accessing said memory, and a third input arranged to receive said clock signal, said enable means further including an output, said enable means generating said transfer signal from said output.

7. A synchronizing circuit as claimed in 1, further comprising:
clear means arranged to receive said transfer signal, and responsive to said clear means receiving said transfer signal said clear means blocks further generation of said transfer signal until said end detector means detects that said time-division multiplexed system has finished accessing said interface circuit.

8. A synchronizing circuit as claimed in 2, wherein said clock generator means is a JK-FF.

9. A synchronizing circuit as claimed in 3, wherein said end detector means is a D-FF.

10. A synchronizing circuit as claimed in 5, wherein said Glitch Filter means is a D-FF.

11. A synchronizing circuit as claimed in 6, wherein said enable means is a D-FF.

12. A synchronizing circuit as claimed in 7, wherein said clear means is a D-FF.

13. A synchronizing circuit for generating a transfer signal arranged to indicate when data is to be transferred through an interface circuit, said interface circuit connected between a microprocessor system and a time-division-multiplexed system, said microprocessor system includes a memory, said synchronizing circuit comprising:
clock generator means for generating a clock signal only when said microprocessor system is accessing said memory;
end detector means arranged to detect when said time-division multiplexed system has finished accessing said interface circuit;
glitch filter means connected to said end detector means, said glitch filter means arranged to stabilize said end detector means;
enable means connected to said clock generator means and said glitch filter means, said enable means generating said transfer signal, and;
clear means arranged to receive said transfer signal, and responsive to receiving said transfer signal said clear means blocks further generation of said transfer signal until said end detector means detects that said time-division multiplexed system has finished accessing said interface circuit.

14. A synchronizing circuit as claimed in 13, wherein said clock generator means including a first input arranged to receive a first memory signal from said microprocessor system signifying that said microprocessor system is preparing to access said memory, and said clock generator means further including a second input arranged to receive a validation signal from said microprocessor system, wherein said validation signal defines when said first memory signal is valid.

15. A synchronizing circuit as claimed in 13, wherein said end detector means including an input arranged to receive an end signal from said time-division multiplexed system, said end detector means generating an end detected signal.

16. A synchronizing circuit as claimed in 15; wherein said glitch filter including a first input arranged to receive said end detected signal and a second input arranged to receive said clock signal, said glitch filter means further including an output, said glitch filter means arranged to generate a stabilized end detected signal from said output.

17. A synchronizing circuit as claimed in 16, wherein said enable means including a first input arranged to receive said stabilized end detected signal, a second input arranged to receive a second memory signal from said microprocessor system signifying that said microprocessor system is accessing said memory, and a third input arranged to receive said clock signal, said enable means further including an output, said enable means generating said transfer signal from said output.

18. A synchronizing circuit as claimed in 13, wherein said clear means is a D-FF.

19. A synchronizing circuit as claimed in 14, wherein said clock generator means is a JK-FF.

20. A synchronizing circuit as claimed in 15, wherein said end detector means is a D-FF.

21. A synchronizing circuit as claimed in 16, wherein said Glitch Filter means is a D-FF.

22. A synchronizing circuit as claimed in 17, wherein said enable means is a D-FF.

23. A process for generating a transfer signal to transfer data through an interface circuit, said interface circuit connected between a microprocessor system and a time-division-multiplexed system, said microprocessor system includes a memory, said process comprising the steps of:
generating a clock signal, said step of generating a clock signal is only performed while said microprocessor system is accessing said memory;
detecting when said time-division multiplexed system has finished accessing said interface circuit;
waiting for said clock signal, and;
generating said transfer signal.

* * * * *